(12) United States Patent
Garcia Arizpe (10) Patent No.: US 9,635,816 B2
(45) Date of Patent: May 2, 2017

(54) ASSEMBLY FOR VERTICALLY ARRANGED PLANTS WITH A BUILT-IN WATERING SYSTEM

(71) Applicant: Ignacio Garcia Arizpe, Coahulia (MX)

(72) Inventor: Ignacio Garcia Arizpe, Coahulia (MX)

( * ) Notice: Subject to any disclaimer, the term of this patent is extended or adjusted under 35 U.S.C. 154(b) by 105 days.

(21) Appl. No.: 14/405,344

(22) PCT Filed: Jun. 17, 2013

(86) PCT No.: PCT/MX2013/000074
§ 371 (c)(1),
(2) Date: Dec. 3, 2014

(87) PCT Pub. No.: WO2014/017894
PCT Pub. Date: Jan. 30, 2014

(65) Prior Publication Data
US 2015/0173313 A1   Jun. 25, 2015

(30) Foreign Application Priority Data
Jul. 23, 2012   (MX) .................... MX/a/2012/008742

(51) Int. Cl.
*A01G 9/02* (2006.01)
*A01G 27/00* (2006.01)
*A01G 9/12* (2006.01)

(52) U.S. Cl.
CPC ............ *A01G 27/005* (2013.01); *A01G 9/022* (2013.01); *A01G 9/023* (2013.01); *A01G 9/12* (2013.01)

(58) Field of Classification Search
CPC ........ A01G 9/022; A01G 9/023; A01G 9/024; A01G 27/005; A01G 27/006; A01G 9/12
See application file for complete search history.

(56) References Cited

U.S. PATENT DOCUMENTS 3,452,475 A * 7/1969 Johnson, Sr. .......... A01G 9/023
47/82
3,841,023 A * 10/1974 Carlyon, Jr. .......... A01G 9/023
239/20

(Continued)

FOREIGN PATENT DOCUMENTS

EP           0623276       9/1994
WO        WO 9007266     12/1990

*Primary Examiner* — Kathleen Alker
(74) *Attorney, Agent, or Firm* — Michael Feigin, Esq.; Feigin & Fridman LLC (57) ABSTRACT

The invention relates to an assembly for arranging plants vertically, with a built-in watering system, applicable to plants contained in plant pots (11), consisting of a framework with individual supports for plant pots, a water container provided with a trickier in the upper part, a support with a drainage collector in the lower part, and plant pots, used to carry water to the upper container where it passes through the trickier and falls to an relief (8.1) in the body of the plant pot just below. From there, it is guided to an inner cavity (8.2) which finally allows the water to enter the plant pot. The excess water is ejected via a drainage opening with a conduit used as an extension and falls to the relief of the plant pot directly beneath, in order to repeat the process in the plant pots. These elements create a supporting structure for arranging plants vertically, with a watering system that operates under gravity.

5 Claims, 11 Drawing Sheets

(56) References Cited

U.S. PATENT DOCUMENTS

| | | | | |
|---|---|---|---|---|
| 4,593,490 A | * | 6/1986 | Bodine | A01G 9/022 47/79 |
| 4,676,023 A | * | 6/1987 | Mori | A01G 31/06 47/48.5 |
| 6,840,008 B1 | | 1/2005 | Bullock | |
| 2009/0000189 A1 | * | 1/2009 | Black | A01G 27/02 47/82 |
| 2011/0113685 A1 | * | 5/2011 | Chang | A01G 9/025 47/39 |
| 2012/0167460 A1 | * | 7/2012 | Omidi | A01G 9/023 47/65.7 |
| 2013/0152467 A1 | * | 6/2013 | Chang | A01G 9/025 47/82 |
| 2013/0152468 A1 | * | 6/2013 | Huang | A01G 9/022 47/82 |
| 2014/0075840 A1 | * | 3/2014 | Gosling | A01G 9/025 47/81 |

* cited by examiner

ASSEMBLY FOR VERTICALLY ARRANGED PLANTS WITH A BUILT-IN WATERING SYSTEM

OBJECT OF THE INVENTION

The present invention relates to an equipment for arranging plants vertically, with a built-in watering system, applicable to plants contained in plant pots, composing of a structure and plant pots designed to obtain notable conveniences in handling and watering plants arranged on a vertical plane.

The equipment of the invention is envisaged so that through its design, vertically arranged plants can be assembled, disassembled, and watered in a rapid and simple manner.

BACKGROUND OF THE INVENTION

Some structures or assembly means are known for arranging plants vertically and watering them in that arrangement.

One of the most widely used methods consists of a thick mesh which is hung or assembled in a structure or panels in order to remain vertical. Plants are inserted in this mesh or panels with mesh such that their roots become entwined with it, watering being provided when water is carried to the upper part or to different parts of the mesh by means of hose or conduits, and the water then descending under gravity, saturating the mesh and watering the plants.

The main drawback of this system is the complexity and time required for assembling and removing the plants because their roots are entwined with the mesh.

Other known systems use containers or plant pots with plants, which are arranged by means of a structure or secured at an angle of no less than 90° or more than 180° with respect to the vertical. They generally do not have means for watering, which must be done manually, one plant pot at a time. In cases where there are means for watering the plants, said means consist of hoses or conduits carrying the water to the open or upper part of the container or plant pots.

The main drawback of these systems consists of the time required for watering the plants manually or, where appropriate, for removing and positioning the device, hose or conduit carrying water to each container or plant pot, provided that said plants must be assembled or disassembled.

DESCRIPTION OF THE INVENTION

The main difference between the system of the present invention and the systems using a mesh or panels with mesh for carrying water to vertically arranged plants is that the former uses plants that are individually contained in plant pots. This difference creates the advantage of being able to assemble and disassembled the plants more easily and more rapidly because the roots are not secured or are wrapped around anything, and the plant pots are simply placed on the structure.

The difference between the system of the present invention and other systems using containers or plant pots for arranging plants vertically is that between the supporting structure and the plant pots of the former there is integrated a water to each plant pot without connecting them to hoses or conduits for that purpose. This difference creates the advantage of notably reducing the number of elements to include a watering system in these assembly methods and to also reduce the time required for assembling or disassembling the plant pots in/from the structure device for carrying water to them.

To achieve the objective of having a rapid method for introducing and removing the vertically arranged plants, as well as having a simple watering method using a small number of elements or devices for that purpose, the equipment of the invention has a new structure capable of assembling or supporting plants vertically contained in plant pots, of containing and distributing the water for watering from the upper part, of carrying water to the plant pots without said device whatsoever for that purpose, and of collecting the excess water or water drainage in the lower part.

Therefore, since there is provided a simpler method for connections or attachments for carrying water to the plant pots, said plant pots can be more rapidly introduced or removed.

The watering method in the present invention works as follows: the assembly arranges plant pots directly above one another and always with the open part at the same angle of between 91° and 170° with respect to the vertical, and it includes a container in the upper part to where watering water is carried, from said container it descends under gravity through a flow-regulating device, and it slowly and constantly exits said flow-regulating device in a trickling manner.

The watering water then falls to a low relief located on the side part or body of the plant pot just below it, and from there it is guided to a cavity in the inner part which has an array of inward openings, thus allowing the distribution of the watering water.

Due to the angle or inclination, once the plant pot becomes saturated with moisture, it guides the excess water to the lowest part at the bottom from where it is ejected by a drainage opening, and as the water exits through the drainage opening, it once again falls in a trickling manner to the low relief of the plant pot directly beneath it in order to repeat the process and in the remaining plant pots.

The excess water or water drainage ejected from the lowest plant pot is collected in a receptacle for recycling it or for preventing overflow.

To complement the description and help better understand the features of the invention, a set of drawings is attached to the present specification.

PREFERRED EMBODIMENT OF THE INVENTION

Figure 1:
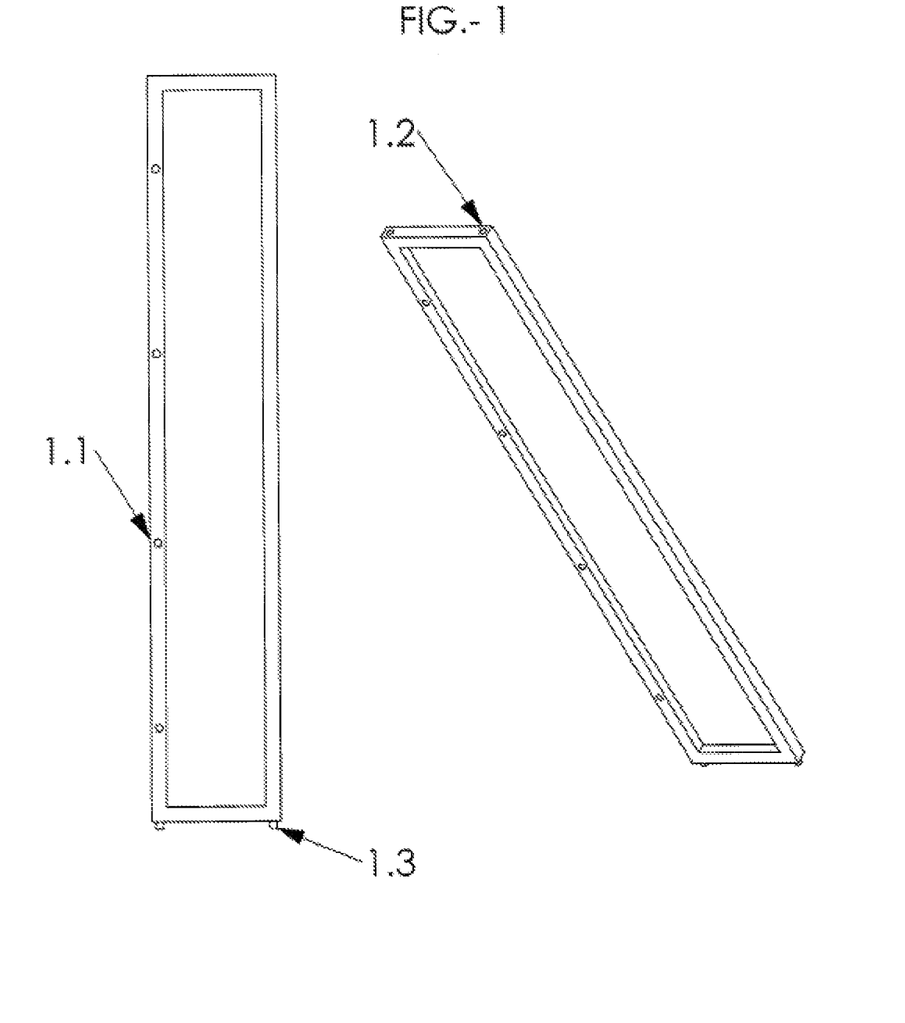
FIG. 1 shows a side view and a perspective view of the framework, where conduits (1.1) on the longest side, conduits (1.2) in the corners of the upper end and tubular extensions (1.3) in the corners of the lower end are seen.
Figure 2:
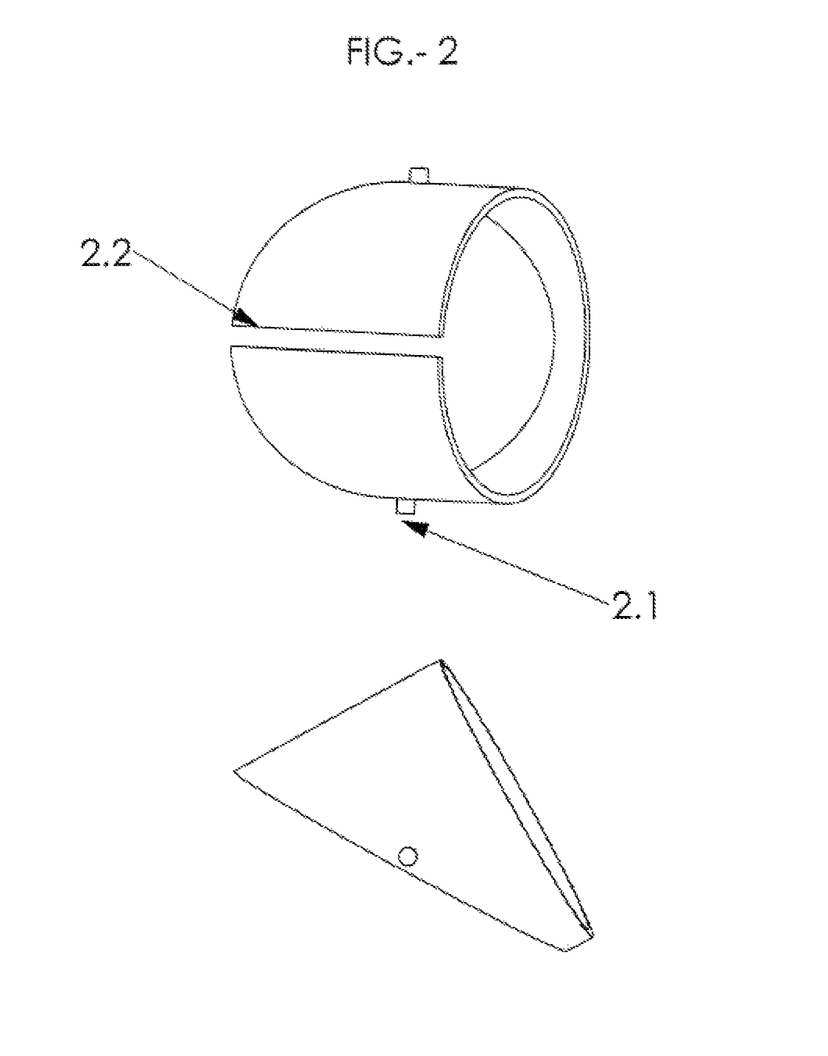
FIG. 2 shows two perspective views of the plant pot support, where the tubular extension (2.1) on both sides of the part and the through groove or opening (2.2) on its longest side are seen.
Figure 3:
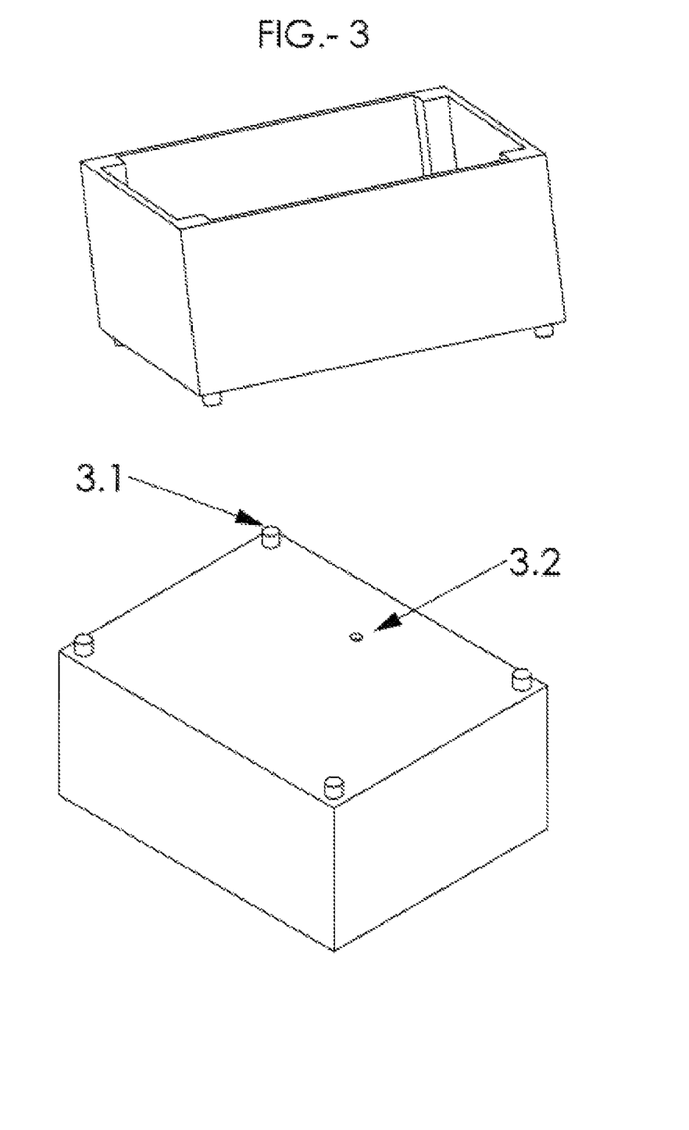
FIG. 3 shows two perspective views of the water container, where the tubular extensions (3.1) in the corners of the base and the opening (3.2) also in its base are seen.
Figure 4:
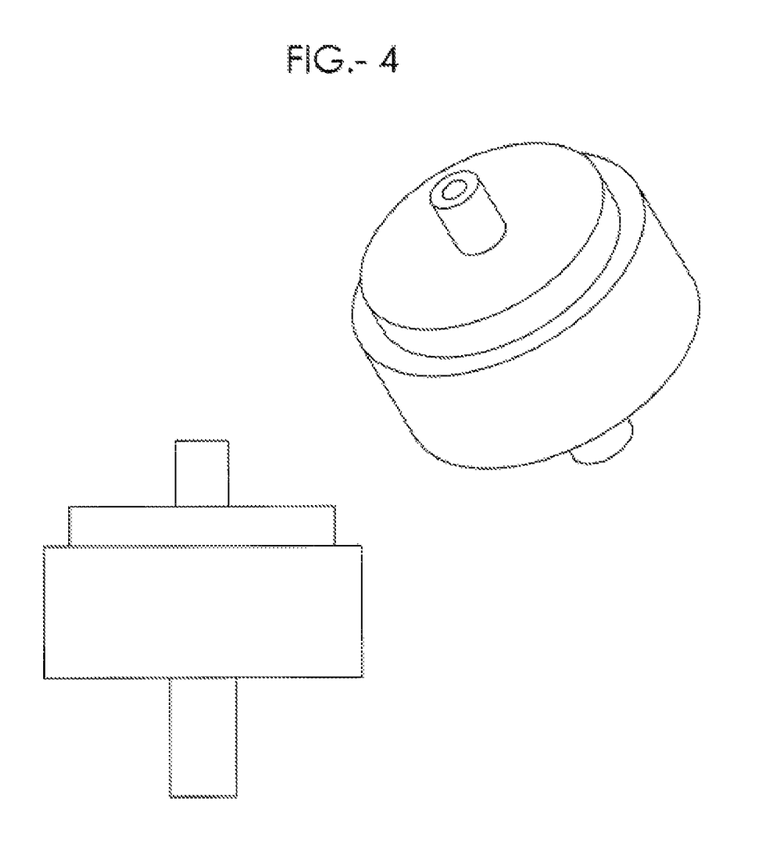
FIG. 4 shows a front view and a perspective view of a trickler.
Figure 5:
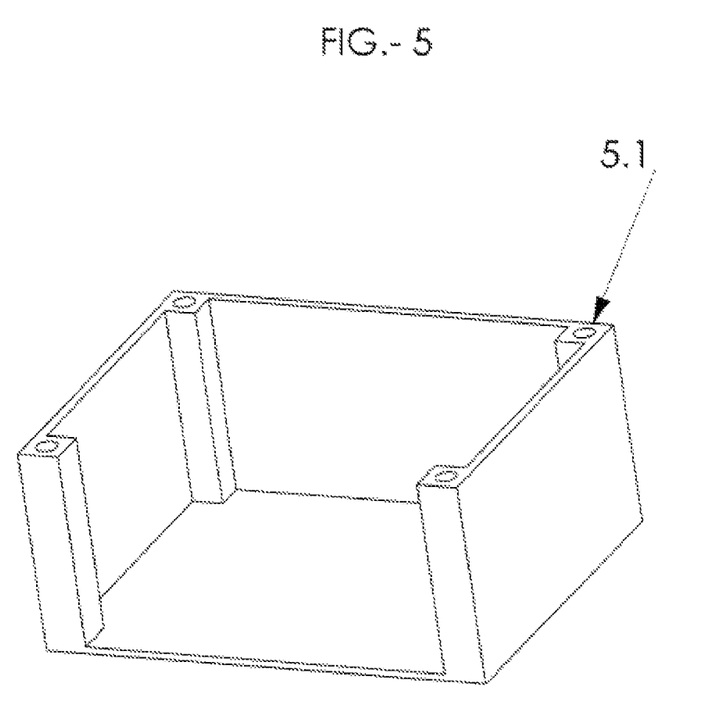
FIG. 5 shows a perspective view of the collector support, where conduits (5.1) in the upper corners of the part are seen.
Figure 6:
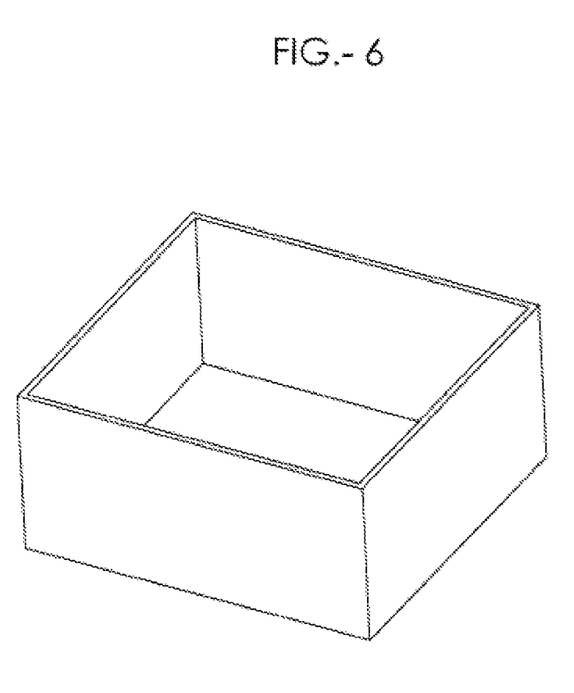
FIG. 6 shows a perspective view of the drainage collector.
Figure 7:
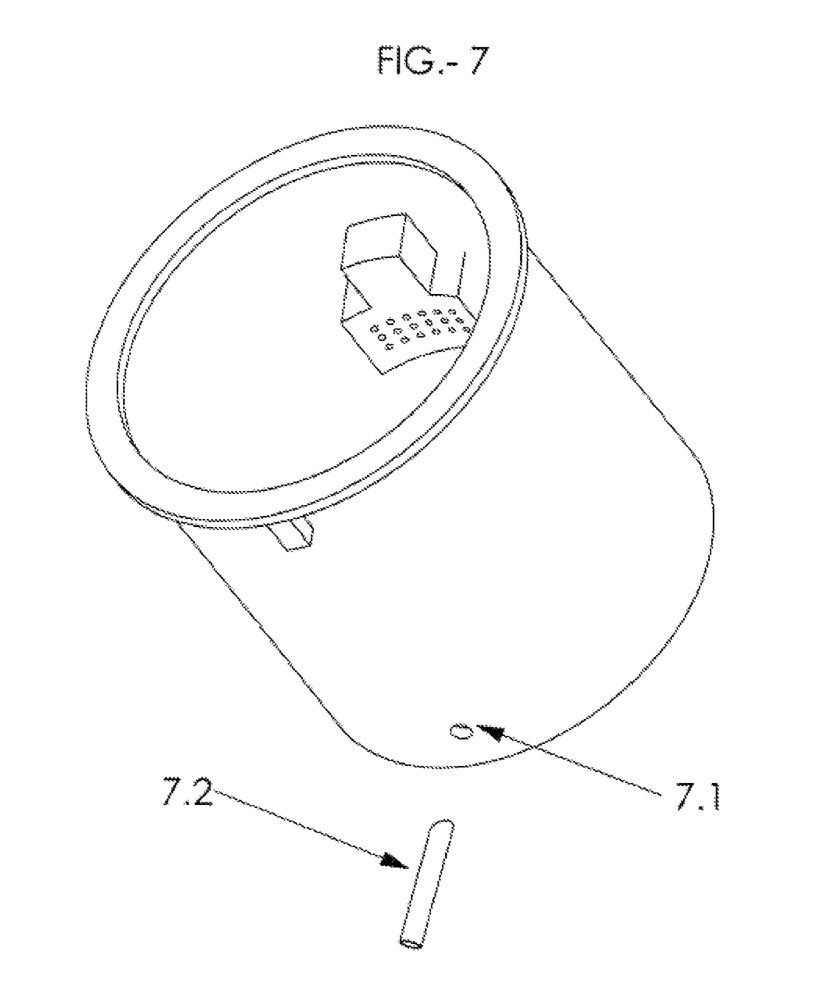
FIG. 7 shows a perspective view of the plant pot, where a drainage opening (7.1) and an extension tube (7.2) inserted therein are seen.

In view of these drawings, it can be seen how the assembly of the invention comprises:

FIG. 1.—framework; FIG. 2.—plant pot support; FIG. 3.—water container; FIG. 4.—trickler; FIG. 5.—collector support; FIG. 6.—drainage collector; FIG. 7.—plant pot.

All these components, which are built using a rigid material with hardness and strength characteristics, furthermore being suitable for the injection molding process, such as polypropylene or some other plastic composite having similar properties.

The rectangular-shaped framework (1) has conduits (1.1) on the longest side for coupling or connecting the plant pot supports to it, conduits (1.2) in the corners of the upper end, and tubular extensions (1.3) in the corners of the lower end, which allow coupling or connecting the water container to the framework in the upper part and the collector support in the lower part.

The plant pot support (2) must hold the plant pots such that they neither obstruct nor cover the low relief that allows water to enter the plant pot neither the opening for ejecting the excess water or water drainage, and the plant pots must be arranged with the open part always being at the same angle of between 91° and 170° with respect to the vertical. The support also has a tubular extension (2.1) on both sides for being coupled or connected to the framework and a through groove or opening (2.2) that performs the function of assuring the correct position of the plant pot and of allowing the movement of said plant pot in the support.

The water container (3) will be rectangular-shaped and located in the upper part of the structure, will have tubular extensions (3.1) in the four corners of the base for being coupled or connected to the frameworks, and will have an opening (3.2) in the base for inserting the trickler.

The trickler (4) is a device that allows regulating the rate at which water flows through it, said trickler being commonly used in the agricultural industry, and it is located below the water container for distributing water in a trickling manner to the plant pot directly beneath it.

The collector support (5) is rectangular-shaped and located in the lower part of the structure, having conduits (5.1) in the four corners opposite the base for being coupled or connected to the frameworks.

The drainage collector (6) is rectangular-shaped, fits inside the collector support and is not fixed to same, the function thereof being to store the excess water draining out of the lower plant pot.

Figure 8:
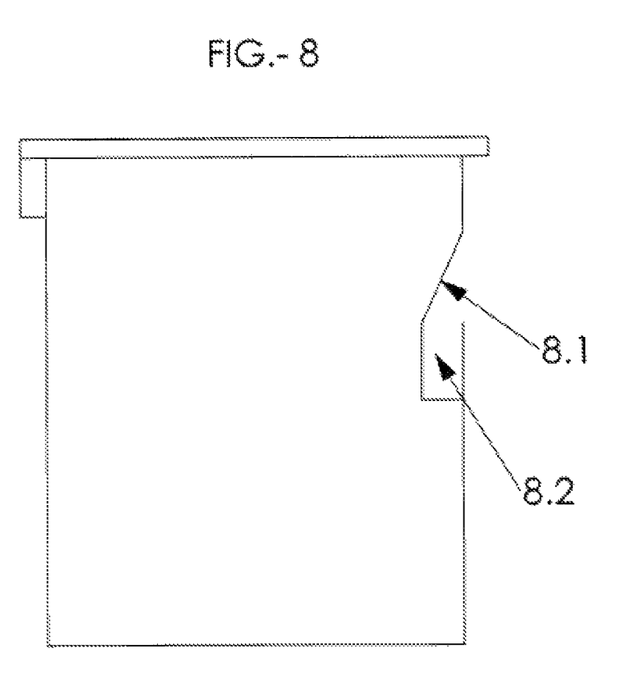
FIG. 8 shows a section view of the plant pot, where an opening in the form of a low relief (8.1) and a cavity in the inner wall (8.2) are seen.
Figure 9:
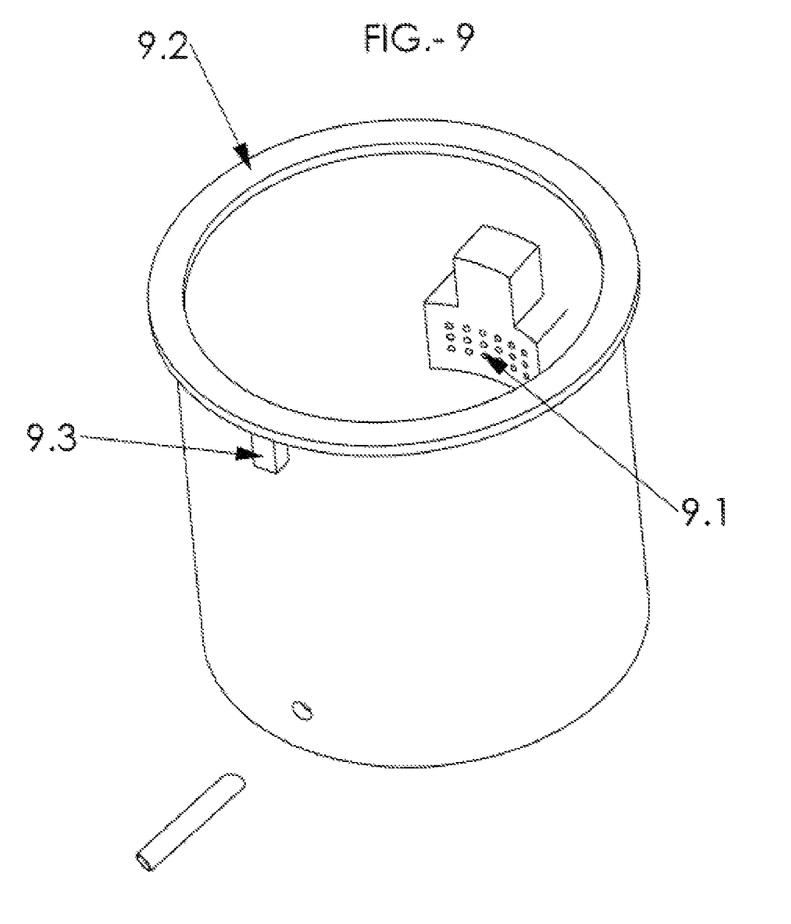
FIG. 9 shows a perspective view of the plant pot, where an array of inward openings (9.1) into the plant pot is seen, as well as a tab or side extension (9.2) in the open or upper part of the plant pot, and a flange or guide (9.3) in the same location aligned with the drainage opening.
Figure 10:
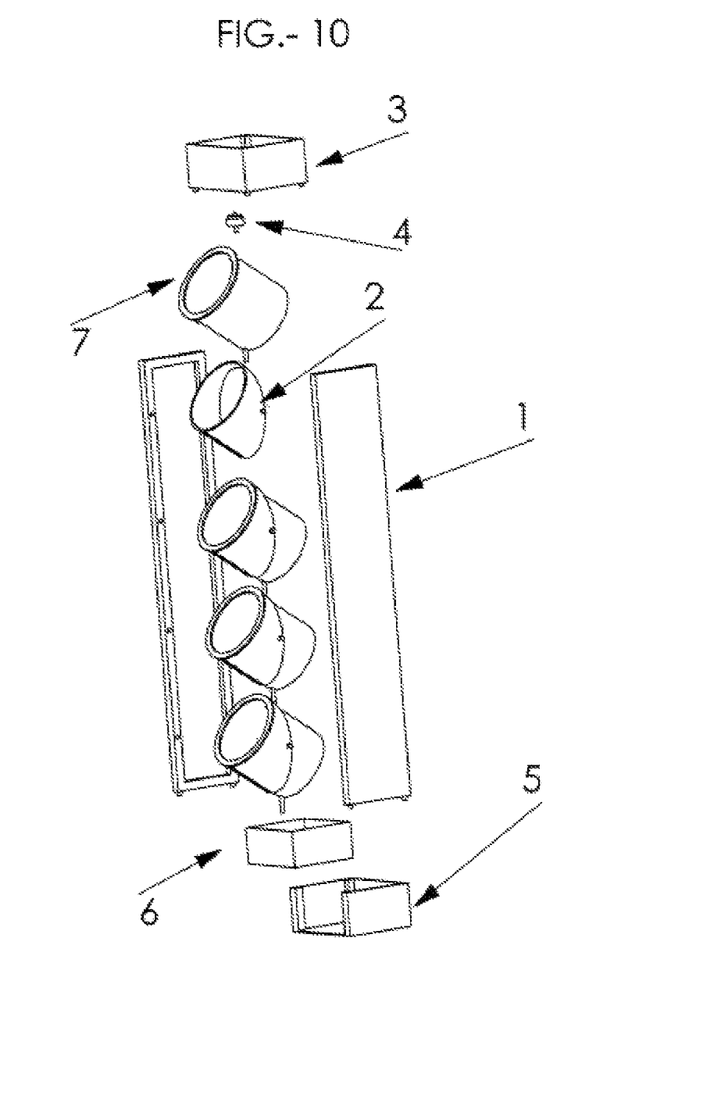
FIG. 10 shows a perspective view of all the components of the assembly.
Figure 11:
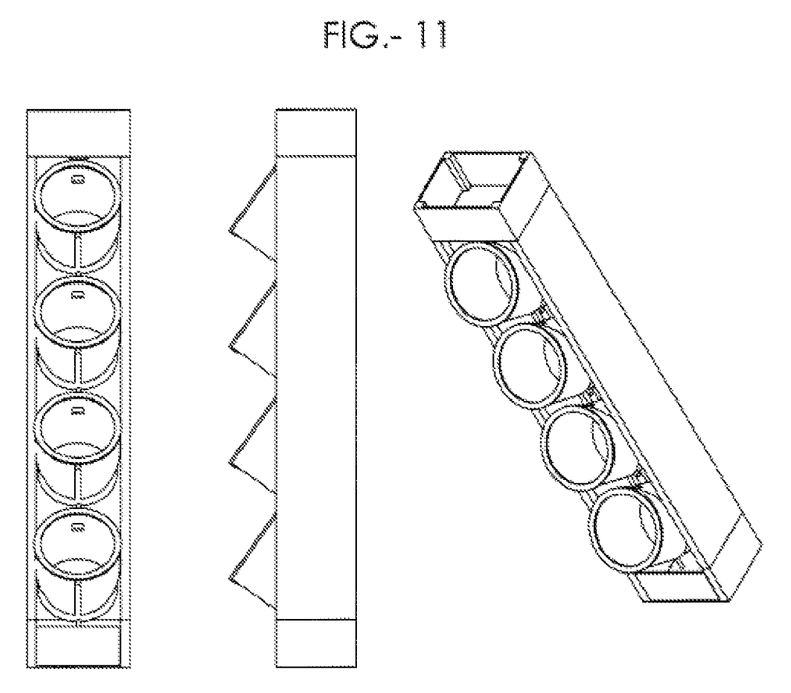
FIG. 11 shows a front view, a side view and a perspective view of the assembly as it is mounted or assembled.

The circular-shaped plant pot (7) has an opening (7.1) for draining the excess watering water and includes a tube or conduit (7.2) inserted in the drainage opening, which carries the excess water or water drainage to a point that is nearby or just above the low relief in the plant pot directly beneath it, having an opening (8.1) that allows water to enter the side part or body of the plant pot, and consisting of an low relief that directs the water falling from the upper plant pot or container to a cavity (8.2) in the inner wall of the plant pot, there being located in this cavity an array of openings (9.1) facing the inner side of the plant pot, where the watering water finally enters the plant pot.

The plant pot must have a tab or side extension (9.2) in the open or upper part, the function of which is to be used as a stop between the plant pot and the plant pot support, also having a flange or guide (9.3) in the same part of the plant pot, which assures its correct position in the support and is aligned with the drainage opening.

It is not considered necessary to further expand this description so that a person skilled in the art may understand the scope of the innovation and the advantages derived from it, as well as the manner in which it can be used by the industry.

The materials, shape, size and arrangement of the components may vary provided that this does not entail changing the essential features of the invention.

The descriptive terms used in this specification must always be interpreted in a broad and non-limiting manner.

The invention claimed is:

1. Equipment for vertically arranged plants, with a built-in watering system applicable to plants contained in plant pots, comprising:
    a rectangular framework holding a plurality of plant pots, said rectangular framework being on either side of each plant pot of said plurality of plant pots;
    individual supports, wherein each individual support comprises two tubular extensions being coupled to said rectangular framework, and a through groove or opening for assuring a correct position as well as movement of the respective plant pot within the respective support;
    a water container coupled to said rectangular framework, said water container having a base operatively coupled to a water flow regulating device or trickier above said plurality of plant pots;
    said plurality of plant pots being located below said water container and above a removable receptacle; and
    a collector support coupled to said rectangular framework and operatively positioned to receive water drained from said plurality of plant pots which, in turn, receive water from said water container;
    wherein at least one plant pot of said plurality of plant pots has an opening in the form of a low relief in a side part or body thereof which is configured such that water flows from the water container into said low relief, then enters a cavity in an inner wall of said at least one plant pot, then flows to a plant which absorbs the water, whereby excess water passes through a drainage opening of said at least one plant pot, said drainage opening being on an opposite side from said opening of said low relief, and then the water flows into a second plant pot of said plurality of plant pots, said plurality of plant pots arranged vertically relative to one another; and
    wherein said watering system operates due to the force of gravity.

2. The equipment for vertically arranged plants of claim 1, wherein a bottom side of at least one plant pot is angled between 91° and 170° with respect to a vertical plane.

3. The equipment for vertically arranged plants of claim 1, wherein each plant pot of said plurality of plant pots further comprises a tab or a side extension used as a stop between each plant pot and a respective support in said rectangular framework and each plant pot also includes a guiding flange for assuring a correct position in the respective support.

4. The equipment for vertically arranged plants of claim 3, wherein at least one plant pot comprises said drainage opening operatively connected to a tube or a conduit as an extension for carrying water to a point that is nearby and just above the opening or the low relief of said second plant pot which is directly beneath said at least one plant pot.

5. The equipment for vertically arranged plants of claim 1, wherein said inner wall has an array of openings.

* * * * *